(12) United States Patent
Liu et al.

(10) Patent No.: US 10,764,243 B2
(45) Date of Patent: Sep. 1, 2020

(54) METHOD AND APPARATUS FOR KEEPING NETWORK ADDRESS TRANSLATION MAPPING ALIVE

(71) Applicant: Huawei Technologies Co., Ltd., Shenzhen (CN)

(72) Inventors: Yan Liu, Shenzhen (CN); Yang Xiao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 155 days.

(21) Appl. No.: 16/142,978

(22) Filed: Sep. 26, 2018

(65) Prior Publication Data

US 2019/0028429 A1    Jan. 24, 2019

Related U.S. Application Data

(63) Continuation of application No. PCT/CN2017/076829, filed on Mar. 15, 2017.

(30) Foreign Application Priority Data

Mar. 28, 2016 (CN) .......................... 2016 1 0184480

(51) Int. Cl.
*H04L 29/12* (2006.01)
*H04L 29/06* (2006.01)
(Continued)

(52) U.S. Cl.
CPC ...... *H04L 61/2521* (2013.01); *H04L 61/2514* (2013.01); *H04L 61/2553* (2013.01);
(Continued)

(58) Field of Classification Search
CPC ............. H04L 61/2521; H04L 61/2557; H04L 61/2514; H04L 61/2553; H04L 67/12;
(Continued)

(56) References Cited

U.S. PATENT DOCUMENTS

| 7,272,148 B2 | 9/2007 | Zhang et al. |
| 2006/0146746 A1* | 7/2006 | Kim .................. H04L 67/34 370/328 |

(Continued)

FOREIGN PATENT DOCUMENTS

| CN | 101026567 A | 8/2007 |
| CN | 101064625 A | 10/2007 |

(Continued)

OTHER PUBLICATIONS

C. Bormann et al, Terminology for Constrained-Node Networks. RFC7228, May 2014, 17 pages.

(Continued)

*Primary Examiner* — Philip J Chea
*Assistant Examiner* — Wuji Chen
(74) *Attorney, Agent, or Firm* — Leydig, Voit & Mayer, Ltd.

(57) ABSTRACT

A method and an apparatus for keeping network address translation mapping alive are provided. The method includes: receiving, by a network address translation NAT device, a probe request sent by an internal network device; sending a probe response to the internal network device, where the probe response carries indication information, and the indication information indicates that the internal network device does not actively initiate a heartbeat message to keep network address translation mapping alive; allocating at least two public network addresses to the internal network device from an address resource pool, and using in each time period of a subsequent session process between the internal network device and an external network device, one of the at least two public network addresses as a current active address in the time period, to map the private network address of the internal network device to the current active address.

16 Claims, 4 Drawing Sheets

(51) Int. Cl.
*H04L 29/08* (2006.01)
*H04L 12/26* (2006.01)

(52) U.S. Cl.
CPC .......... *H04L 61/2557* (2013.01); *H04L 43/12* (2013.01); *H04L 63/0236* (2013.01); *H04L 67/12* (2013.01)

(58) Field of Classification Search
CPC ..... H04L 63/0236; H04L 43/12; H04L 67/14; H04L 67/10
See application file for complete search history.

(56) References Cited

U.S. PATENT DOCUMENTS

| | | | | |
|---|---|---|---|---|
| 2008/0225865 | A1* | 9/2008 | Herzog | H04W 52/0229 370/401 |
| 2009/0097477 | A1* | 4/2009 | Zhu | H04L 12/2861 370/352 |
| 2009/0135842 | A1* | 5/2009 | Zhu | H04L 29/12471 370/401 |
| 2009/0240824 | A1* | 9/2009 | Rekhtman | H04L 61/2553 709/230 |
| 2016/0006689 | A1* | 1/2016 | Li | H04L 29/12471 709/228 |
| 2016/0380967 | A1* | 12/2016 | Moore | H04L 61/2589 709/217 |

FOREIGN PATENT DOCUMENTS

| | | |
|---|---|---|
| CN | 101094171 A | 12/2007 |
| CN | 101159738 A | 4/2008 |
| CN | 101552745 A | 10/2009 |
| CN | 102281335 A | 12/2011 |
| CN | 104601738 A | 5/2015 |
| EP | 2012502 B1 | 9/2018 |
| WO | 2012110103 A1 | 8/2012 |

OTHER PUBLICATIONS

F. Audet et al, Network Address Translation (NAT) Behavioral Requirements for Unicast UDP. RFC4787, Jan. 2007, 29 pages.
C. Jennings et al, Managing Client-Initiated Connections in the Session Initiation Protocol (SIP). RFC5626, Oct. 2009, 50 pages.
S. Guha et al, NAT Behavioral Requirements for TCP. RFC5382, Oct. 2008, 21 pages.
Ford, et al. "Issues with IP Address Sharing," IETF, Request for Comments 6269, ISSN: 2070-1721, pp. 1-29, Internet Engineering Task Force, Reston, Virginia (Jun. 2011).

* cited by examiner

METHOD AND APPARATUS FOR KEEPING NETWORK ADDRESS TRANSLATION MAPPING ALIVE

CROSS-REFERENCE TO RELATED APPLICATIONS

This application is a continuation application of International Application No. PCT/CN2017/076829, filed on Mar. 15, 2017, which claims priority to Chinese Patent Application No. 201610184480.0, filed on Mar. 28, 2016. The disclosures of the aforementioned applications are hereby incorporated by reference in their entireties.

TECHNICAL FIELD

Embodiments of the present invention relate to the field of communications technologies, and in particular, to a method and an apparatus for keeping network address translation mapping alive.

BACKGROUND

Emergence of the Internet of Things (IoT for short) brings convenience to people's life. In the IoT field, there are a large quantity of resource constrained nodes that are mainly characterized by low energy consumption, low storage, and low resource computing and processing capabilities. The resource constrained node is faced with many security threats because of the low resource processing capability of the resource constrained node. For example, an IP network protocol is mainly encrypted based on a key and a random number, and a key length recommended by the Internet Engineering Task Force (IETF) is 112 bits. However, the resource constrained node cannot store and process a key of such a length.

In consideration of node security, a network address translation (NAT for short) technology is used in the conventional art. Specifically, a NAT device maps an internal device network address to an external device network address. This can not only reduce a requirement for the external device network address, but also can hide the internal device network address, thereby implementing security isolation.

Currently, the following three types of mapping are usually used in the NAT technology: endpoint-independent mapping, address-dependent mapping, and address and port-dependent mapping.

The endpoint-independent mapping means that for a data packet sent from a same internal IP address and a same internal port to any external IP address and an external port, the internal IP address and the internal port are mapped to a same external IP address and a same external port.

The address-dependent mapping means that for a data packet sent from a same internal IP address and a same internal port to a same external IP address, the internal IP address and the internal port are mapped to a same external IP address and a same external port regardless of an external port number.

The address and port-dependent mapping means that for a packet sent from a same internal IP address and a same internal port to a same external IP address and a same external port, the internal IP address and the internal port are mapped to the same external IP address and the same external port.

Regardless of which mapping manner is used by the NAT device in the NAT technology, the NAT device allocates a corresponding external network address of an external device to an internal network address corresponding to an internal device, and needs to keep a mapping relationship between the internal network address and the external network address alive.

However, in the current NAT technology, the internal device needs to send a heartbeat message to keep an address mapping relationship alive. In addition, the NAT technology is used to shield an IP address of a resource constrained node to improve security. However, in a User Datagram Protocol (UDP for short) scenario, it is unacceptable for a resource constrained node with low energy consumption to frequently send a heartbeat message to keep an address mapping relationship alive. In a Transmission Control Protocol (TCP for short) scenario, an external mapping address of a resource constrained node is fixed for a long period of time because the resource constrained node is in a connected state for a long period of time. Consequently, it is more likely that an external attacker steals an address to send a forged message, and security of the resource constrained node is reduced.

SUMMARY

Embodiments of the present invention provide a method and an apparatus for keeping network address translation mapping alive, so that a resource constrained node does not need to frequently send a heartbeat message to keep an address mapping relationship alive, and security of the resource constrained node is ensured.

According to a first aspect, an embodiment of the present invention provides a method for keeping network address translation mapping alive, including:

receiving, by a NAT device, a probe request sent by an internal network device, where the probe request includes a private network address of the internal network device;

after receiving the probe request, sending, by the NAT device, a probe response to the internal network device, where the probe response carries indication information, and the indication information is used to indicate that the internal network device does not actively initiate a heartbeat message to keep network address translation mapping alive; and allocating at least two public network addresses to the internal network device from idle public network addresses included in an address resource pool, and using, by the NAT device in each time period of a subsequent session process between the internal network device and an external network device, one of the at least two public network addresses as a current active address in the time period, to map the private network address of the internal network device to the current active address.

In this embodiment of the present invention, when first receiving the request sent by the internal network device, the NAT device allocates the at least two public network addresses for an internal network address, cyclically activates the at least two public network addresses, and uses an activated address as a public network address to which the private network address of the internal network device is mapped, so that the internal network device does not need to send the heartbeat message to keep the network address mapping alive, thereby reducing energy consumption of the internal network device. Because cyclic activation is performed, the public network address to which the private network address of the internal network device is mapped is not fixed in the session process between the internal network device and the external network device. Therefore, a security risk that the external network device obtains the public network address to which the private network address is mapped is reduced.

In a possible design, the using, by the NAT device in each time period of a subsequent session process between the internal network device and an external network device, one of the at least two public network addresses as a current active address in each time period includes:

cyclically performing, by the NAT device, the following operations in sequence for the at least two public network addresses based on a sequence of configuring the at least two public network addresses:

starting timing when a current public network address is selected until timing duration reaches timeout duration corresponding to the public network address, and using the currently selected public network address as the current active address in the current timing process, where one public network address is corresponding to one piece of timeout duration.

In a possible design, the method further includes:

receiving, by the NAT device, a first data report message sent by the internal network device to the external network device, where a source address in the first data report message is the private network address of the internal network device; and replacing, by the NAT device, the private network address of the internal network device in the data report message with a first address that serves as the current active address, and sending the first data report message to the external network device.

In a possible design, the method further includes: when receiving the first data report message sent by the internal network device to the external network device, marking, by the NAT device as a current mapping address, the first address that serves as the current active address.

In a possible design, the method further includes:

receiving, by the NAT device, a first instruction message sent by the external network device to the internal network device, where a destination address in the first instruction message is a second address, and the marked current mapping address is the second address; and determining, by the NAT device, that the destination address in the first instruction message is the same as the marked current mapping address, changing the destination address in the first instruction message into the private network address of the internal network device to which the second address is mapped, and sending the first instruction message to the internal network device.

In a possible design, the method further includes:

receiving, by the NAT device, a second data report message sent by the internal network device to the external network device, where a source address in the second data report message is the private network address of the internal network device, a public network address that serves as the current active address is a third address, and the marked current mapping address is a fourth address; and replacing, by the NAT device, the private network address of the internal network device in the second data report message with the third address, sending the second data report message to the external network device, marking, as a previous mapping address, the fourth address marked as the current mapping address, and marking, as the current mapping address, the third address that serves as the current active address, where the previous mapping address and the current mapping address are each in a mapping relationship with the private network address of the internal network device.

In a possible design, the method further includes:

receiving, by the NAT device, a second instruction message sent by the external network device to the internal network device, where a destination address in the second instruction message is a fifth address, the marked current mapping address is a sixth address, and the marked previous mapping address is the fifth address;

determining, by the NAT device, that the destination address in the second instruction message is different from the marked current mapping address, and the destination address in the second instruction message is the same as the marked previous mapping address; and changing, by the NAT device, the destination address in the second instruction message into the private network address of the internal network device to which the fifth address is mapped, and sending the second instruction message to the internal network device.

In a possible design, the public network address that serves as the current active address is a seventh address, and the method further includes:

when determining that the destination address in the second instruction message is different from the marked current mapping address, and the destination address in the second instruction message is the same as the marked previous mapping address, marking, by the NAT device as the current mapping address, the seventh address that serves as the current active address, and marking, as the previous mapping address, the sixth address marked as the current mapping address.

In a possible design, after the determining, by the NAT device, that the destination address in the second instruction message is different from the marked current mapping address, and the destination address in the second instruction message is the same as the marked previous mapping address, the method further includes:

sending, by the NAT device, an indication message to the external network device, where the indication message is used to indicate that an address to which the internal network device is mapped is changed into the seventh address that serves as the current active address.

In a possible design, the method further includes:

receiving, by the NAT device, a third instruction message sent by the external network device to the internal network device, where a destination address in the third instruction message is an eighth address, the marked current mapping address is a ninth address, and the marked previous mapping address is a tenth address;

determining, by the NAT device, that the destination address in the third instruction message is different from the marked current mapping address, and the destination address in the third instruction message is different from the marked previous mapping address; and adding, by the NAT device, a source address in the third instruction message to an alarm list, and discarding the third instruction message.

In a possible design, the method further includes:

receiving, by the NAT device, a fourth instruction message sent by the external network device to the internal network device; and when determining that a source address in the fourth instruction message is the same as one of addresses included in the alarm list, discarding, by the NAT device, the fourth instruction message.

By using the foregoing design, if it is determined, based on the alarm list, that the fourth instruction message is an abnormal message, the fourth instruction message is directly discarded and not forwarded. Therefore, security is improved.

According to a second aspect, an embodiment of the present invention provides an apparatus for keeping network address translation mapping alive, where the apparatus is applied to a network address translation NAT device and includes:

a receiving module, configured to receive a probe request sent by an internal network device, where the probe request includes a private network address of the internal network device;

a sending module, configured to: after the receiving module receives the probe request, send a probe response to the internal network device, where the probe response carries indication information, and the indication information is used to indicate that the internal network device does not actively initiate a heartbeat message to keep network address translation mapping alive; and a processing module, configured to: allocate at least two public network addresses to the internal network device from idle public network addresses included in an address resource pool, and use, in each time period of a subsequent session process between the internal network device and an external network device, one of the at least two public network addresses as a current active address in the time period, to map the private network address of the internal network device to the current active address.

In a possible design, the apparatus further includes:

a timing module, configured to perform timing on duration in which each public network address selected by the processing module serves as a current active address; and the processing module is configured to cyclically perform the following operations in sequence for the at least two public network addresses based on a sequence of configuring the at least two public network addresses:

instructing the timing module to start timing when a current public network address is selected until timing duration of the timing module reaches timeout duration corresponding to the public network address, and using the currently selected public network address as the current active address in the current timing process of the timing module, where one public network address is corresponding to one piece of timeout duration, and timing duration corresponding to each public network address is preset for the timing module.

In a possible design, the apparatus further includes at least two timing modules, and one timing module is corresponding to one public network address;

the timing module is configured to perform timing on duration in which a public network address that is corresponding to the timing module and that is selected by the processing module serves as a current active address; and the processing module is configured to cyclically perform the following operations in sequence for the at least two public network addresses based on a sequence of configuring the at least two public network addresses:

instructing a timing module corresponding to a currently selected public network address to start timing when the processing module selects the current public network address until timing duration of the timing module reaches timeout duration corresponding to the public network address, and using the currently selected public network address as the current active address in the current timing process of the timing module, where one public network address is corresponding to one piece of timeout duration.

In a possible design, the receiving module is further configured to receive a first data report message sent by the internal network device to the external network device, where a source address in the first data report message is the private network address of the internal network device;

the processing module is further configured to replace the private network address of the internal network device in the first data report message received by the receiving module with a first address that serves as the current active address; and the sending module is further configured to send the first data report message processed by the processing module to the external network device.

In a possible design, the processing module is further configured to:

when the receiving module receives the first data report message sent by the internal network device to the external network device, mark, as a current mapping address, the first address that serves as the current active address.

In a possible design, the receiving module is further configured to:

receive a first instruction message sent by the external network device to the internal network device, where a destination address in the first instruction message is a second address, and the marked current mapping address is the second address;

the processing module is further configured to: determine that the destination address in the first instruction message received by the receiving module is the same as the marked current mapping address, and change the destination address in the first instruction message into the private network address of the internal network device to which the second address is mapped; and the sending module is further configured to send the first instruction message processed by the processing module to the internal network device.

In a possible design, the receiving module is further configured to:

receive a second data report message sent by the internal network device to the external network device, where a source address in the second data report message is the private network address of the internal network device, a public network address that serves as the current active address is a third address, and the marked current mapping address is a fourth address; and the processing module is further configured to: replace the private network address of the internal network device in the second data report message received by the receiving module with the third address, so that the sending module sends the second data report message processed by the processing module to the external network device; mark, as a previous mapping address, the fourth address marked as the current mapping address; and mark, as the current mapping address, the third address that serves as the current active address, where the previous mapping address and the current mapping address are each in a mapping relationship with the private network address of the internal network device.

In a possible design, the receiving module is further configured to:

receive a second instruction message sent by the external network device to the internal network device, where a destination address in the second instruction message is a fifth address, the marked current mapping address is a sixth address, and the marked previous mapping address is the fifth address;

the processing module is further configured to: determine that the destination address in the second instruction message received by the receiving module is different from the marked current mapping address, and the destination address in the second instruction message is the same as the marked previous mapping address; and change the destination address in the second instruction message into the private network address of the internal network device to which the fifth address is mapped; and the sending module is further configured to send the second instruction message processed by the processing module to the internal network device.

In a possible design, the public network address that serves as the current active address is a seventh address, and the processing module is further configured to:

when determining that the destination address in the second instruction message is different from the marked current mapping address, and the destination address in the second instruction message is the same as the marked previous mapping address, mark, as the current mapping address, the seventh address that serves as the current active address, and mark, as the previous mapping address, the sixth address marked as the current mapping address.

In a possible design, the sending module is further configured to:

after the processing module determines that the destination address in the second instruction message is different from the marked current mapping address, and the destination address in the second instruction message is the same as the marked previous mapping address, send an indication message to the external network device, where the indication message is used to indicate that an address to which the internal network device is mapped is changed into the seventh address that serves as the current active address.

In a possible design, the receiving module is further configured to receive a third instruction message sent by the external network device to the internal network device, where a destination address in the third instruction message is an eighth address, the marked current mapping address is a ninth address, and the marked previous mapping address is a tenth address; and the processing module is further configured to: determine that the destination address in the third instruction message is different from the marked current mapping address, and the destination address in the third instruction message is different from the marked previous mapping address; and add a source address in the third instruction message to an alarm list, and discard the third instruction message.

In a possible design, the receiving module is further configured to:

receive a fourth instruction message sent by the external network device to the internal network device; and the processing module is further configured to: when determining that a source address in the fourth instruction message is the same as one of addresses included in the alarm list, discard the fourth instruction message.

In the embodiments of the present invention, when first receiving the request sent by the internal network device, the NAT device allocates the at least two public network addresses for an internal network address, cyclically activates the at least two public network addresses, and uses an activated address as a public network address to which the private network address of the internal network device is mapped, so that the internal network device does not need to send the heartbeat message to keep the network address mapping alive, thereby reducing energy consumption of the internal network device. Because cyclic activation is performed, the public network address to which the private network address of the internal network device is mapped is not fixed in the session process between the internal network device and the external network device. Therefore, a security risk of that the external network device obtains the public network address to which the private network address is mapped is reduced.

DESCRIPTION OF EMBODIMENTS

To make the objectives, technical solutions, and advantages of the present invention clearer, the following further describes the present invention in detail with reference to the accompanying drawings. Apparently, the described embodiments are merely some rather than all of the embodiments of the present invention. All other embodiments obtained by persons of ordinary skill in the art based on the embodiments of the present invention without creative efforts shall fall within the protection scope of the present invention.

The embodiments of the present invention provide a method and an apparatus for keeping network address translation mapping alive, so that a resource constrained node does not need to frequently send a heartbeat message to keep an address mapping relationship alive, and security of the resource constrained node is ensured. The method and the apparatus are based on a same inventive concept. Because problem-resolving principles of the method and the apparatus are similar, implementations of the apparatus and the method may be mutually referred. No repeated description is provided.

It should be noted that the terms "first", "second", and the like in the specification, claims, and accompanying drawings in the embodiments of the present invention are intended to distinguish between similar objects, but do not necessarily indicate a specific order or sequence.

Figure 1:
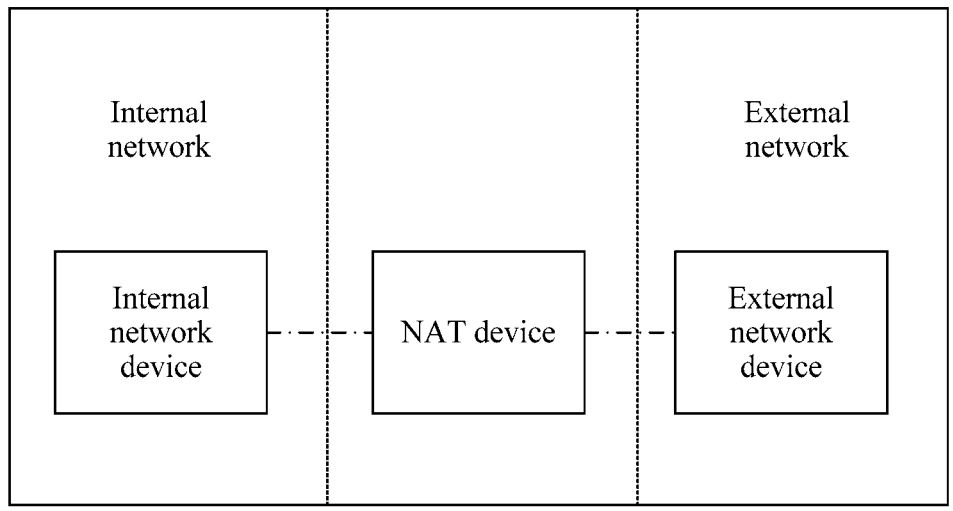
FIG. 1 is a schematic diagram of an application system according to an embodiment of the present invention.

As shown in FIG. 1, a system to which an embodiment of the present invention is applied includes a NAT device, an internal network device, and an external network device.

The NAT device divides a network into two networks: an internal network (or referred to as a private network) and an external network (or referred to as a public network). A network connected to an internal interface of the NAT device is the internal network, and a network connected to an external interface of the NAT device is the external network. A device that performs communication by using the internal network is referred to as the internal network device, and a device that performs communication by using the external network is referred to as the external network device. The internal network device communicates with the external network device by using the NAT device. For example, by using the NAT device, the internal network device has a network address, in the external network, that is translated by the NAT device and that represents an address of the internal network device in the internal network. The external network device knows only the translated network address, but does not know the address of the internal network device in the internal network.

This embodiment of the present invention may be applied to a resource constrained node. In other words, the internal network device may be a resource constrained node. In this embodiment of the present invention, the resource constrained node is a node with constrained computing, storage, energy consumption, and bandwidth, and is especially a node with constrained energy consumption and bandwidth, for example, a mobile terminal such as a mobile phone or a tablet computer that may serve as a node in the Internet of Things. The resource constrained node in this embodiment of the present invention may alternatively be a resource constrained node or a constrained device specified in the Internet Engineering Task Force RFC 7228.

The external network device in this embodiment of the present invention may be a cloud server, an IoT platform, another terminal device in the external network, or the like.

Figure 2:
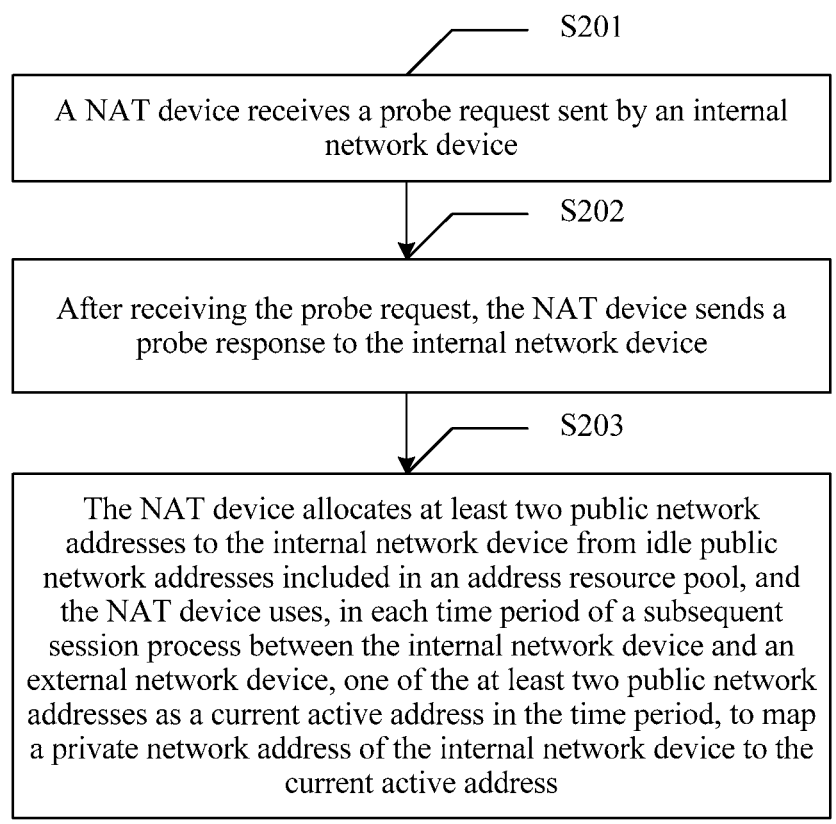
FIG. 2 is a flowchart of a method for keeping network address translation mapping alive according to an embodiment of the present invention.

As shown in FIG. 2, an embodiment of the present invention provides a method for keeping network address mapping alive. The method includes the following steps.

S201. A NAT device receives a probe request sent by an internal network device.

The probe request includes a private network address of the internal network device.

The private network address of the internal network device may be represented in a 2-tuple form such as in an X:x form, where X represents an IP address, and x represents a port number.

S202. After receiving the probe request, the NAT device sends a probe response to the internal network device.

The probe response carries indication information, and the indication information is used to indicate that the internal network device does not actively initiate a heartbeat message to keep network address translation mapping alive.

S203. The NAT device allocates at least two public network addresses to the internal network device from idle public network addresses included in an address resource pool, and the NAT device uses, in each time period of a subsequent session process between the internal network device and an external network device, one of the at least two public network addresses as a current active address in the time period, to map a private network address of the internal network device to the current active address.

When the NAT device allocates the at least two public network addresses to the internal network device from the idle public network addresses included in the address resource pool, the NAT device may select an IP address and port from the resource pool according to a specific rule. For example, the NAT device may select to allocate four public network addresses. For the four public network addresses, IP addresses are the same, and port numbers progressively increase. The four public network addresses are represented as follows: Y1:ya1, Y1:ya2, Y1:ya3, and Y1:ya4.

In this embodiment of the present invention, when first receiving the request sent by the internal network device, the NAT device allocates the at least two public network addresses for an internal network address, cyclically activates the at least two public network addresses, and uses an activated address as a public network address to which the private network address of the internal network device is mapped, so that the internal network device does not need to send the heartbeat message to keep the network address mapping alive, reducing energy consumption of the internal network device. Because cyclic activation is performed, the public network address to which the private network address of the internal network device is mapped is not fixed in the session process between the internal network device and the external network device. Therefore, reducing a security risk that the external network device obtains the public network address to which the private network address is mapped is reduced.

Optionally, the NAT device may use, in each time period of the subsequent session process between the internal network device and an external network device, the one of the at least two public network addresses as the current active address in the time period in the following manner:

the NAT device cyclically performs the following operations in sequence for the at least two public network addresses based on a sequence of configuring the at least two public network addresses:

starting timing when a current public network address is selected until timing duration reaches timeout duration corresponding to the public network address, and using the currently selected public network address as the current active address in the current timing process.

Optionally, when the NAT device uses, in each time period of the subsequent session process between the internal network device and the external network device, the one of the at least two public network addresses as the current active address in the time period, the NAT device may start to select a public network address as the current active address when receiving a first data report message sent by the internal network device; or the NAT device may start to select a public network address as the current active address after allocating the at least two public network addresses to the internal network device from the idle public network addresses included in the address resource pool.

In this embodiment of the present invention, that a public network address is cyclically selected from the at least two public network addresses as the current active address may be referred to as a cyclic activation mechanism. The cyclic activation mechanism may be started when the first data report message sent by the internal network device is received or when the at least two public network addresses are allocated to the internal network device.

Optionally, the allocated at least two public network addresses may be stored in a form of an address linked list. A sequence of selecting the public network addresses in the linked list is a sequence of cyclically selecting the public network addresses.

One public network address is corresponding to one piece of timeout duration. Timeout duration corresponding to each public network address may be the same or different. This is not specifically limited in this embodiment of the present invention. In this embodiment of the present invention, a timer may be configured for each allocated public network address, and when the public network address is selected, the timer for the public network address is started. Certainly, a timer may be configured for all public network addresses, and timing duration of the timer varies with a selected public network address. Specifically, the timing duration of the timer may be preconfigured, and a sequence of configuring timing duration is the same as a sequence of configuring the public network addresses.

For example, the NAT device allocates four public network addresses to the internal network device, and the four public network addresses are respectively Y1:ya1, Y1:ya2, Y1:ya3, and Y1:ya4. A configuration sequence is shown in Table 1.

TABLE 1

| Y1: ya1 | Y1: ya2 | Y1: ya3 | Y1: ya4 |

The NAT device may cyclically keep the public network addresses alive in Table 1 by using a NAT binding timeout timer.

As shown in Table 2, each public network address is corresponding to one piece of timeout duration.

TABLE 2

| | Public network address | | | |
| --- | --- | --- | --- | --- |
| | Y1: ya1 | Y1: ya2 | Y1: ya3 | Y1: ya4 |
| Timeout duration | timeout 1 | timeout 2 | timeout 3 | timeout 4 |

Figure 3:
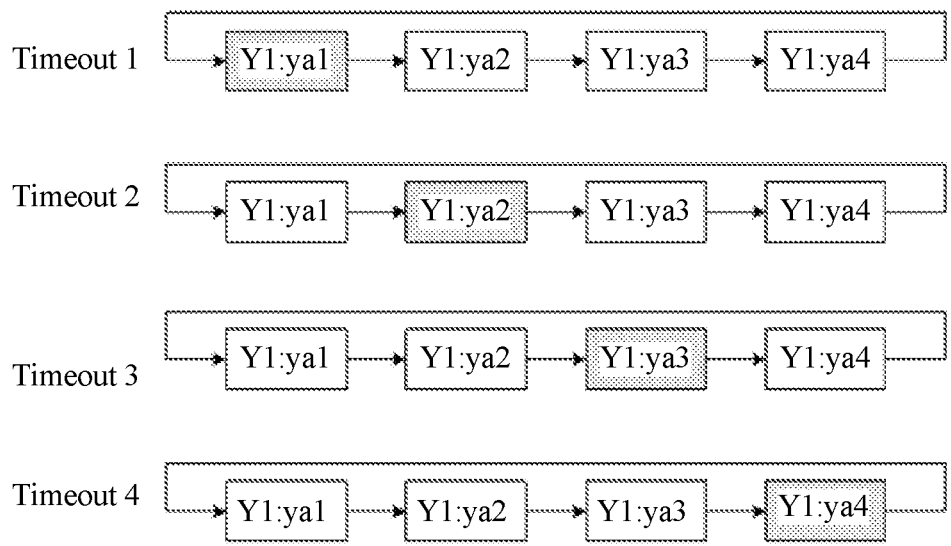
FIG. 3 is a schematic diagram of cyclically selecting a current active address according to an embodiment of the present invention.

It is assumed that the private network address of the internal network device is X:x, and a start moment of first timing is 0. Therefore, as shown in FIG. 3, a manner of selecting a public network address as the current active address is as follows:

(1). A first selected public network address is Y1:ya1, and the NAT device uses the public network address (Y1:ya1) as the current active address in a time period from the moment 0 to a timeout 1. The NAT device automatically starts mapping between the private network address (X:x) of the internal network device and the public network address (Y1:ya1). In the time period from the moment 0 to the timeout 1, if the NAT device receives a message sent from the internal network device to an external network, the NAT device maps the private network address of the internal network device to the public network address (Y1: ya1).

(2). When the timeout duration is the timeout 1, the NAT device selects a public network address Y1:ya2 in sequence, and the NAT device uses the public network address (Y1: ya2) as the current active address in a time period from the timeout 1 to timeout 1+timeout 2. In other words, the NAT device automatically starts mapping between the private network address (X:x) of the internal network device and the public network address (Y1:ya2). In the time period from the timeout 1 to timeout 1+timeout 2, if the NAT device receives a message sent from the internal network device to the external network, the NAT device maps the private network address of the internal network device to the public network address (Y1:ya2).

(3). When the timeout duration is timeout 1+timeout 2, the NAT device selects a public network address Y1:ya3 in sequence, and the NAT device uses the public network address (Y1:ya3) as the current active address in a time period from timeout 1+timeout 2 to timeout 1+timeout 2+timeout 3. In other words, the NAT device automatically starts mapping between the private network address (X:x) of the internal network device and the public network address (Y1:ya3). In the time period from timeout 1+timeout 2 to timeout 1+timeout 2+timeout 3, if the NAT device receives a message sent from the internal network device to the external network, the NAT device maps the private network address of the internal network device to the public network address (Y1:ya3).

(4). When the timeout duration is timeout 1+timeout 2+timeout 3, the NAT device selects a public network address Y1:ya4 in sequence, and the NAT device uses the public network address (Y1:ya4) as the current active address in a time period from timeout 1+timeout 2+timeout 3 to timeout 1+timeout 2+timeout 3+timeout 4. In other words, the NAT device automatically starts mapping between the private network address (X:x) of the internal network device and the public network address (Y1:ya4). In the time period from timeout 1+timeout 2+timeout 3 to timeout 1+timeout 2+timeout 3+timeout 4, if the NAT device receives a message sent from the internal network device to the external network, the NAT device maps the private network address of the internal network device to the public network address (Y1:ya4).

(5). When the timeout duration is timeout 1+timeout 2+timeout 3+timeout 4, the NAT device selects the public network address Y1:ya1 in sequence, and the NAT device uses the public network address (Y1:ya1) as the current active address in a time period from timeout 1+timeout 2+timeout 3+timeout 4 to timeout 1+timeout 2+timeout 3+timeout 4+timeout 1. In other words, the NAT device automatically starts the mapping between the private network address (X:x) of the internal network device and the public network address (Y1:ya1). In the time period from timeout 1+timeout 2+timeout 3+timeout 4 to timeout 1+timeout 2+timeout 3+timeout 4+timeout 1, if the NAT device receives a message sent from the internal network device to the external network, the NAT device maps the private network address of the internal network device to the public network address (Y1:ya1), and so on.

In one aspect, the NAT device receives a first data report message sent by the internal network device to the external network device, and a source address in the first data report message is the private network address of the internal network device. When the NAT device receives the first data report message, a public network address that serves as the current active address is a first address.

The NAT device replaces the private network address of the internal network device in the first data report message with the first address, and sends the first data report message to the external network device.

Optionally, when receiving the first data report message sent by the internal network device to the external network device, the NAT device may mark, as a current mapping address, the first address that serves as the current active address.

In another aspect, the NAT device receives a second data report message sent by the internal network device to the external network device. The source address in the second data report message is the private network address of the internal network device, a public network address that serves as the current active address is a third address, and the marked current mapping address is a fourth address.

The NAT device replaces the private network address of the internal network device in the second data report message with the third address, and sends the second data report message to the external network device, marks, as a previous mapping address, the fourth address marked as the current mapping address, and marks, as the current mapping address, the third address that serves as the current active address.

The previous mapping address and the current mapping address are each in a mapping relationship with the private network address of the internal network device.

For example, in an example of an embodiment shown in FIG. 3, if a message is transmitted between the internal network device and the external network device in the time period from the moment 0 to the timeout 1, the NAT device marks the public network address (Y1:ya1) as the current mapping address. If a message is transmitted between the internal network device and the external network device in the time period from the timeout 1 to timeout 1+timeout 2, the NAT device marks the public network address (Y1:ya2) as the current mapping address, and marks the public network address (Y1:ya1) as the previous mapping address. If no message is transmitted between the internal network device and the external network device in the time period from the timeout 1 to timeout 1+timeout 2, the marked current mapping address remains unchanged, and is still the public network address (Y1:ya1). A subsequent session process between the internal network device and the external network device is similar to this. The public network address marked as the previous mapping address and the public network address marked as the current mapping address are each in a mapping relationship with the private network address of the internal network device. In other words, the public network address (Y1:ya1) and the public network address (Y1:ya2) are each in a mapping relationship with the private network address of the internal network device.

If no message is transmitted in a session process between an internal network device X and an external network device Y in the time period from the timeout 1 to timeout 1+timeout 2, a relationship between a marked previous mapping address and a marked current mapping address is shown in Table 3.

TABLE 3

| | Time period | | | |
|---|---|---|---|---|
| | 0 to a timeout 1 | Timeout 1 to timeout 1 + timeout 2 | Timeout 1 + timeout 2 to timeout 1 + timeout 2 + timeout 3 | Timeout 1 + timeout 2 + timeout 3 to timeout 1 + timeout 2 + timeout 3 + timeout 4 |
| Previous mapping address | NULL | NULL | Y1: ya1 | Y1: ya3 |
| Current mapping address | Y1: ya1 | Y1: ya1 | Y1: ya3 | Y1: ya4 |
| Current active address | Y1: ya1 | Y1: ya2 | Y1: ya3 | Y1: ya4 |

Optionally, in the session process between the internal network device X and the external network device Y, if the NAT device receives a message sent by the external network device Y to the internal network device X, mapping is implemented in the following manner:

In one aspect, the NAT device receives a first instruction message sent by the external network device to the internal network device. A destination address in the first instruction message is a second address, and the marked current mapping address is the second address. The NAT device determines that the destination address in the first instruction message is the same as the marked current mapping address, changes the destination address in the first instruction message into the private network address of the internal network device to which the second address is mapped, and sends the private network address of the internal network device to the internal network device.

In another aspect, the NAT device receives a second instruction message sent by the external network device to the internal network device. A destination address in the second instruction message is a fifth address, the marked current mapping address is a sixth address, and the marked previous mapping address is the fifth address.

The NAT device determines that the destination address in the second instruction message is different from the marked current mapping address, and the destination address in the second instruction message is the same as the marked previous mapping address.

The NAT device changes the destination address in the second instruction message into the private network address of the internal network device to which the fifth address is mapped, and sends the private network address of the internal network device to the internal network device.

Optionally, the public network address that serves as the current active address is a seventh address. When determining that the destination address in the second instruction message is different from the marked current mapping address, and the destination address in the second instruction message is the same as the marked previous mapping address, the NAT device marks, as the current mapping address, the seventh address that serves as the current active address, and marks the sixth address as the previous mapping address.

Optionally, the public network address that serves as the current active address is a seventh address. After the NAT device determines that the destination address in the second instruction message is different from the marked current mapping address, and the destination address in the second instruction message is the same as the marked previous mapping address, the NAT device marks, as the current mapping address, the seventh address that serves as the current active address, marks, as the previous mapping address, the sixth address marked as the current mapping address, and sends an indication message to the external network device. The indication message is used to indicate that an address to which the internal network device is mapped is changed into the seventh address that serves as the current active address. Specifically, the indication message may be set to an empty message, and a source address in the indication message is the seventh address.

In a third aspect, the NAT device receives a third instruction message sent by the external network device to the internal network device. A destination address in the third instruction message is an eighth address, the marked current mapping address is a ninth address, and the marked previous mapping address is a tenth address.

The NAT device determines that the destination address in the third instruction message is different from the marked current mapping address, and the destination address in the third instruction message is different from the marked previous mapping address.

The NAT device adds a source address in the third instruction message to an alarm list, and discards the third instruction message.

Therefore, when the alarm list exists, the NAT device receives a fourth instruction message sent by the external network device to the internal network device. When preferably determining that a source address in the fourth instruction message is the same as one of addresses included in the alarm list, the NAT device directly discards the fourth instruction message.

Optionally, when receiving an end message that is sent by the internal network device or the external network device and that is used to indicate that a session between the internal network device and the external network device ends, the NAT device releases the at least two public network addresses allocated to the internal network device, and releases a mapping relationship between the internal network address of the internal network device and the at least two public network addresses.

The following further describes this embodiment of the present invention with reference to a specific application scenario.

The internal network device is a resource constrained node, and the external network device is a cloud server. The resource constrained node needs to communicate with the cloud server by using the NAT device. A private network address of the resource constrained node is A:a, where A represents an IP address of the resource constrained node in an internal network, and a represents a port number.

Scenario 1

Figure 4:
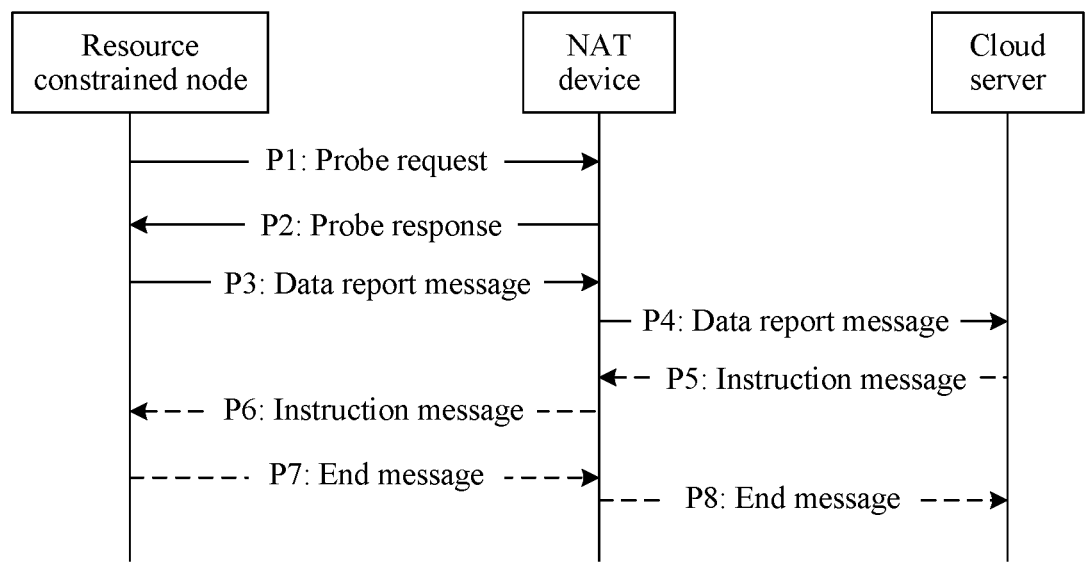
FIG. 4 is a schematic diagram of a method corresponding to a scenario 1 and used for a session between a resource constrained node and a cloud server according to an embodiment of the present invention.

The resource constrained node needs to access the cloud server, and a specific process is shown in FIG. 4.

P1. The resource constrained node sends a probe request to the NAT device. The probe request carries the private network address A:a of the resource constrained node.

P2. The NAT device receives the probe request from the resource constrained node, allocates at least two public network addresses to the resource constrained node, and sends a probe response to the resource constrained node, where the probe response carries indication information, and the indication information is used to indicate that the resource constrained node does not actively initiate a heartbeat message to keep network address translation mapping alive.

An example in which the NAT device allocates four public network addresses to the resource constrained node from a resource pool based on a preset rule is used in this embodiment of the present invention. The allocated four public network addresses are stored in a form of an address linked list. For example, a storage sequence is shown in Table 4.

TABLE 4

| Y1: y1 | Y2: y2 | Y3: y3 | Y4: y4 |
|--------|--------|--------|--------|

P3. The resource constrained node sends a data report message to the NAT device.

P4. After receiving the data report message sent by the resource constrained node, the NAT device starts a cyclic activation mechanism of an address linked list, replaces the private network address of the resource constrained node in the data report message with a selected current active address Y1:y1, and sends the current active address Y1:y1 to the cloud server.

An example in which timeout duration corresponding to each public network address is a timeout is used in this embodiment of the present invention.

Therefore, after receiving the data report message, the NAT device starts a timer. The current active address is Y1:y1 in a time period from a moment at which the timer is first started to a moment at which the timer first times out, that is, a public network address to which the private network address A:a of the resource constrained node is mapped is Y1:y1. By analogy, a current active address corresponding to each time period is shown in Table 5.

TABLE 5

| | Time period | | | |
| | First timeout | Second timeout | Third timeout | Fourth timeout |
|---|---|---|---|---|
| Current active address | Y1: y1 | Y2: y2 | Y3: y3 | Y4: y4 |

Optionally, when the NAT device replaces the private network address of the resource constrained node in the data report message with the selected current active address Y1:y1, and sends the current active address Y1:y1 to the cloud server, the NAT device further marks the current active address Y1:y1 as a current mapping address.

The following steps may be further included.

P5. The cloud server sends an instruction message to the NAT device in a first timeout, where a destination address in the instruction message is Y1:y1.

P6. The NAT device receives, in the first timeout, the instruction message sent by the cloud server. The NAT device determines that the destination address in the instruction message is the same as the marked current mapping address, changes the destination address in the instruction message into A:a to which Y1:y1 is mapped, and sends A:a to the resource constrained node.

P7. In the first timeout, the resource constrained node sends, to the NAT device, an end message used to indicate that a session between the resource constrained node and the cloud server ends.

P8. The NAT device receives the end message sent by the resource constrained node, changes a source address in the end message into Y1:y1, sends Y1:y1 to the cloud server, and releases four public network addresses allocated to the resource constrained node.

It is assumed that after step P4, the resource constrained node sends the data report message to the NAT device in a second timeout. After receiving the data report message sent by the resource constrained node, the NAT device replaces the private network address of the resource constrained node in the data report message with a selected current active address Y2:y2, and sends the current active address Y2:y2 to the cloud server. The NAT device marks, as a previous mapping address, Y1:y1 marked as the current mapping address, and marks the current active address Y2:y2 as a current mapping address.

Scenario 2

The scenario 2 is based on steps P1 to P4 of the scenario 1. The resource constrained node sends the data report message to the NAT device in a second timeout. In this case, the marked previous mapping address is Y1:y1, and the marked current mapping address is Y2:y2.

After the second timeout, the NAT device does not receive, in an $N^{th}$ timeout, a message sent by the resource constrained node or the cloud server, but receives, in an $(N+3)^{th}$ timeout, an instruction message sent by the cloud server, where N is a positive integer. This embodiment of the present invention is described by using an example in which N is equal to 2. In this case, a relationship between a marked previous mapping address and a marked current mapping address from a first timeout to a fourth timeout is described by using an example shown in Table 6.

TABLE 6

|  | Time period | | | | |
| --- | --- | --- | --- | --- | --- |
|  | First timeout | Second timeout | Third timeout | Fourth timeout | Fifth timeout |
| Previous mapping address | NULL | Y1: y1 | Y1: y1 | Y1: y1 | Y1: y1 |
| Current mapping address | Y1: y1 | Y2: y2 | Y2: y2 | Y2: y2 | Y2: y2 |
| Current active address | Y1: y1 | Y2: y2 | Y3: y3 | Y4: y4 | Y1: y1 |

Figure 5:
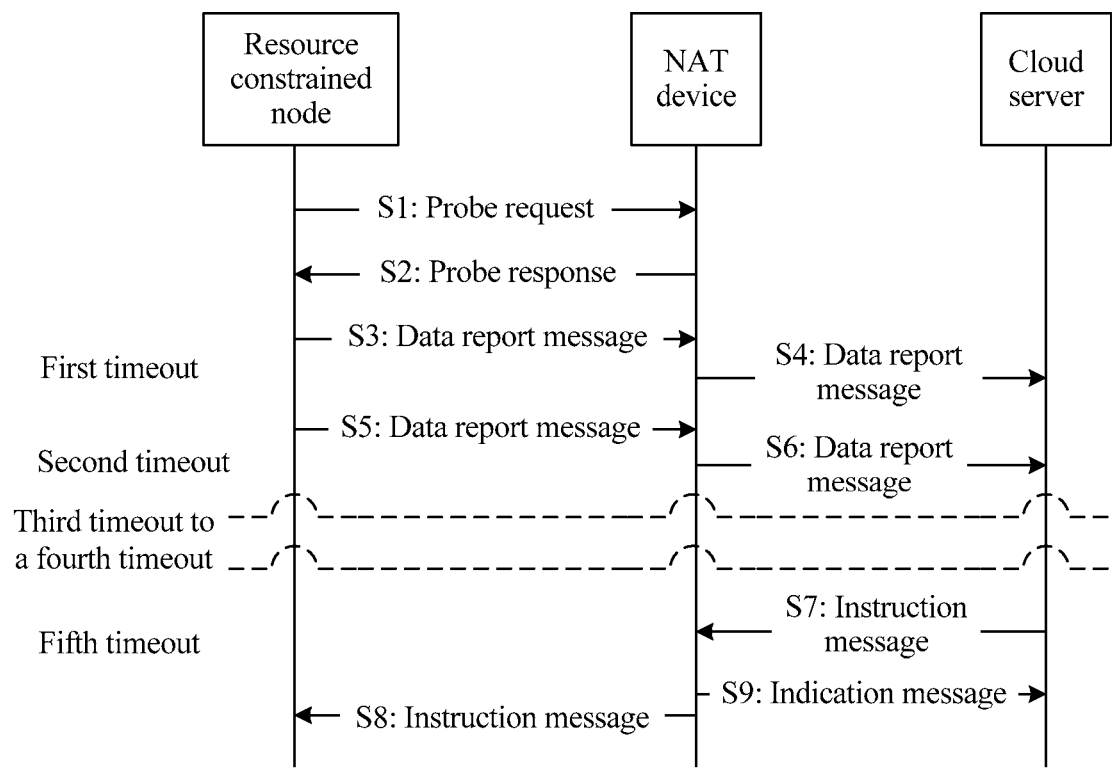
FIG. 5 is a schematic diagram of a method corresponding to a scenario 2 and used for a session between a resource constrained node and a cloud server according to an embodiment of the present invention.

A specific procedure is shown in FIG. 5.

S1 to S4 are the same as P1 to P4, and details are not described herein again.

S5. The resource constrained node sends the data report message to the NAT device in a second timeout.

S6. After receiving the data report message sent by the resource constrained node, the NAT device replaces the private network address of the resource constrained node in the data report message with a selected current active address Y2:y2, and sends the current active address Y2:y2 to the cloud server. The NAT device marks, as a previous mapping address, Y1:y1 marked as the current mapping address, and marks the current active address Y2:y2 as a current mapping address.

S7. The cloud server sends an instruction message to the NAT device in a third timeout, where a destination address in the instruction message is Y1:y1.

S8. The NAT device receives the instruction message sent by the cloud server, and determines that the destination address in the instruction message is different from the current mapping address Y2:y2, but is the same as the previous mapping address Y1:y1. The NAT device marks a current active address Y1:y1 as a current mapping address, and marks Y2:y2 as a previous mapping address. A changed relationship between a marked previous mapping address and a marked current mapping address is shown in Table 7.

TABLE 7

|  | Time period | | | | |
| --- | --- | --- | --- | --- | --- |
|  | First timeout | Second timeout | Third timeout | Fourth timeout | Fifth timeout |
| Previous mapping address | NULL | Y1: y1 | Y1: y1 | Y1: y1 | Y2: y2 |
| Current mapping address | Y1: y1 | Y2: y2 | Y2: y2 | Y2: y2 | Y1: y1 |
| Current active address | Y1: y1 | Y2: y2 | Y3: y3 | Y4: y4 | Y1: y1 |

S9. The NAT device sends an indication message to the cloud server, where the indication message is used to notify the cloud server that an address to which the resource constrained node is mapped is changed into the current active address Y1:y1. Specifically, the indication message may be set to an empty message, and a source address in the indication message is Y1:y1.

Scenario 3

Figure 6:
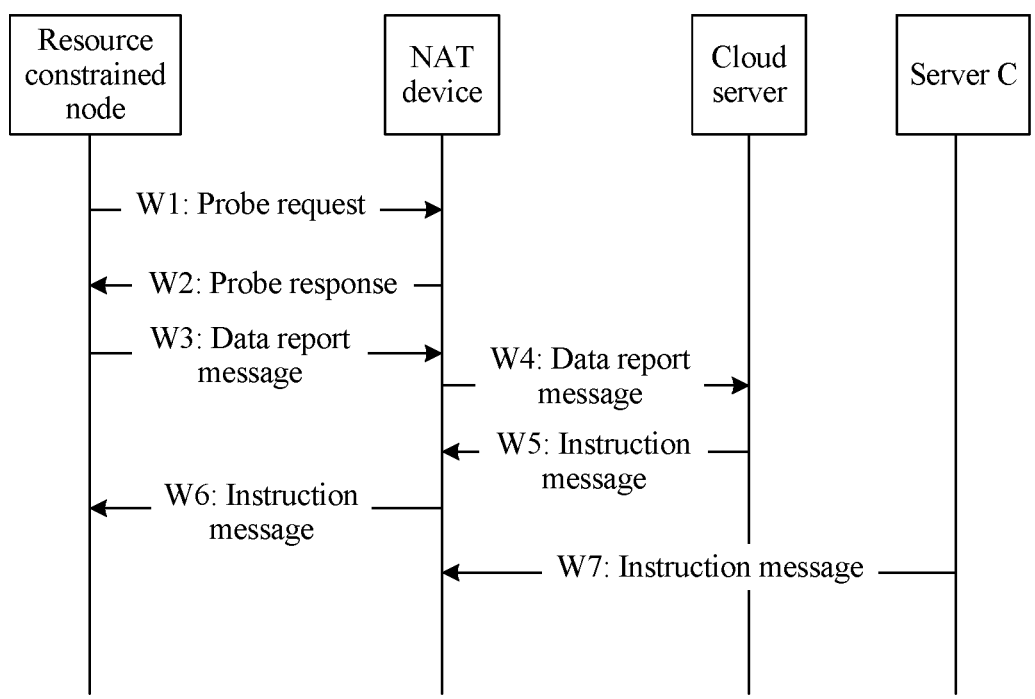
FIG. 6 is a schematic diagram of a method corresponding to a scenario 3 and used for a session between a resource constrained node and a cloud server according to an embodiment of the present invention.

Based on the embodiment corresponding to the scenario 1, in this scenario, a server C steals, in a session process between the resource constrained node and the cloud server, an address to which the resource constrained node is mapped to send a forged message to the resource constrained node. A specific procedure is shown in FIG. 6.

It is assumed that the server C steals the address Y1:y1 to which the resource constrained node is mapped in a first timeout. The server C sends a forged message to the resource constrained node in a third timeout. In the first timeout to the third timeout, a session between the resource constrained node and the cloud server continues. In the third timeout, a current mapping address is Y3:y3, and a previous mapping address is Y2:y2.

W1 to W6 are the same as P1 to P6.

W7. The NAT device receives a forged instruction message sent by the server C, where a destination address in the forged instruction message is Y1:y1. The NAT device determines whether a source address in the instruction message is the same as an address stored in the alarm list, and if the source address is the same as the address stored in the alarm list, directly discards the instruction message. If the source address is different from all addresses included in the alarm list, the NAT device determines that the destination address is different from the current mapping address, and the destination address is different from the previous mapping address, and stores the source address in the alarm list. In addition, the NAT device discards the instruction message.

Figure 7:
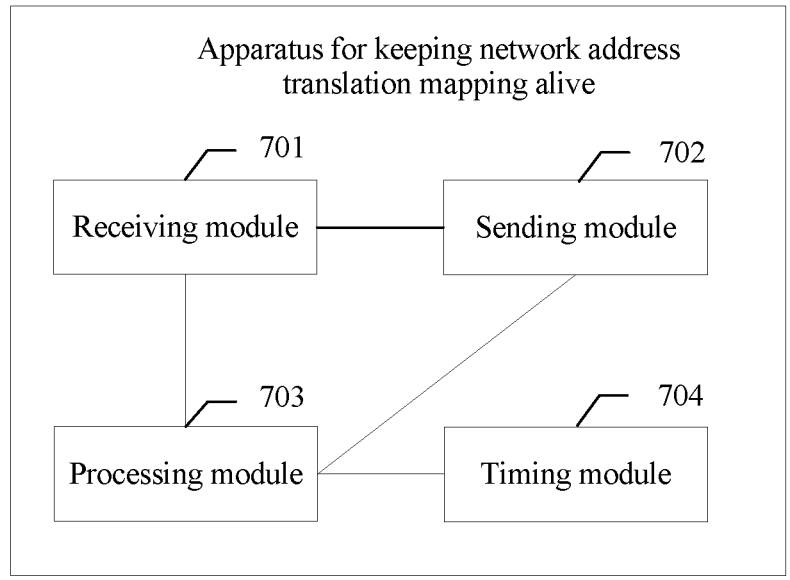
FIG. 7 is a schematic diagram of an apparatus for keeping network address translation mapping alive according to an embodiment of the present invention.

Based on a same inventive concept as the method embodiment, an embodiment of the present invention further provides an apparatus for keeping network address translation mapping alive. The apparatus is applied to a network address translation NAT device. As shown in FIG. 7, the apparatus includes:

a receiving module 701, configured to receive a probe request sent by an internal network device, where the probe request includes a private network address of the internal network device;

a sending module 702, configured to: after the receiving module 701 receives the probe request, send a probe response to the internal network device, where the probe response carries indication information, and the indication information is used to indicate that the internal network device does not actively initiate a heartbeat message to keep network address translation mapping alive; and a processing module 703, configured to: allocate at least two public network addresses to the internal network device from idle public network addresses included in an address resource pool, and use, in each time period of a subsequent session process between the internal network device and an external network device, one of the at least two public network addresses as a current active address in the time period, to map the private network address of the internal network device to the current active address.

Optionally, the apparatus may further include:

a timing module 704, configured to perform timing on duration in which each public network address selected by the processing module 703 serves as a current active address.

The processing module 703 is configured to cyclically perform the following operations in sequence for the at least two public network addresses based on a sequence of configuring the at least two public network addresses:

instructing the timing module 704 to start timing when a current public network address is selected until timing duration of the timing module 704 reaches timeout duration corresponding to the public network address, and using the currently selected public network address as the current active address in the current timing process of the timing module 704.

One public network address is corresponding to one piece of timeout duration, and timing duration corresponding to each public network address is preset for the timing module 704.

Optionally, the apparatus further includes at least two timing modules 704, and one timing module 704 is corresponding to one public network address.

The timing module 704 is configured to perform timing on duration in which a public network address that is corresponding to the timing module 704 and that is selected by the processing module 703 serves as a current active address.

The processing module 703 is configured to cyclically perform the following operations in sequence for the at least two public network addresses based on a sequence of configuring the at least two public network addresses:

instructing a timing module 704 corresponding to a currently selected public network address to start timing when the processing module 703 selects the current public network address, until timing duration of the timing module 704 reaches timeout duration corresponding to the public network address, and using the currently selected public network address as the current active address in the current timing process of the timing module 704.

One public network address is corresponding to one piece of timeout duration.

Optionally, the receiving module 701 is further configured to receive a first data report message sent by the internal network device to the external network device, and a source address in the first data report message is the private network address of the internal network device.

The processing module 703 is further configured to replace the private network address of the internal network device in the data report message received by the receiving module 701 with a first address that serves as the current active address.

The sending module 702 is further configured to send the data report message processed by the processing module 703 to the external network device.

Optionally, the processing module 703 is further configured to:

when the receiving module 701 receives the first data report message sent by the internal network device to the external network device, mark, as a current mapping address, the first address that serves as the current active address.

Optionally, the receiving module 701 is further configured to:

receive a first instruction message sent by the external network device to the internal network device, where a destination address in the first instruction message is a second address, and the marked current mapping address is the second address.

The processing module 703 is further configured to: determine that the destination address in the first instruction message received by the receiving module 701 is the same as the marked current mapping address, and change the destination address in the first instruction message into the private network address of the internal network device to which the second address is mapped.

The sending module 702 is further configured to send the first instruction message processed by the processing module 703 to the internal network device.

Optionally, the receiving module 701 is further configured to:

receive a second data report message sent by the internal network device to the external network device, where a source address in the second data report message is the private network address of the internal network device, a public network address that serves as the current active address is a third address, and the marked current mapping address is a fourth address.

The processing module 703 is further configured to: replace the private network address of the internal network device in the data report message received by the receiving module 701 with the third address, so that the sending module 702 sends the data report message processed by the processing module 703 to the external network device; mark, as a previous mapping address, the fourth address marked as the current mapping address; and mark, as the current mapping address, the third address that serves as the current active address.

The previous mapping address and the current mapping address are each in a mapping relationship with the private network address of the internal network device.

Optionally, the receiving module 701 is further configured to:

receive a second instruction message sent by the external network device to the internal network device, where a destination address in the second instruction message is a fifth address, the marked current mapping address is a sixth address, and the marked previous mapping address is the fifth address.

The processing module 703 is further configured to: determine that the destination address in the second instruction message received by the receiving module 701 is different from the marked current mapping address, and the destination address in the second instruction message is the same as the marked previous mapping address; and change the destination address in the second instruction message into the private network address of the internal network device to which the fifth address is mapped.

The sending module 702 is further configured to send the second instruction message processed by the processing module 703 to the internal network device.

Optionally, the public network address that serves as the current active address is a seventh address, and the processing module 703 is further configured to:

when determining that the destination address in the second instruction message is different from the marked current mapping address, and the destination address in the second instruction message is the same as the marked previous mapping address, mark, as the current mapping address, the seventh address that serves as the current active address, and mark, as the previous mapping address, the sixth address marked as the current mapping address.

Optionally, the sending module 702 is further configured to:

after the processing module 703 determines that the destination address in the second instruction message is different from the marked current mapping address, and the destination address in the second instruction message is the same as the marked previous mapping address, send an indication message to the external network device, where the indication message is used to indicate that an address to which the internal network device is mapped is changed into the seventh address that serves as the current active address.

Optionally, the receiving module 701 is further configured to receive a third instruction message sent by the external network device to the internal network device, where a destination address in the third instruction message is an eighth address, the marked current mapping address is a ninth address, and the marked previous mapping address is a tenth address.

The processing module 703 is further configured to: determine that the destination address in the third instruction message is different from the marked current mapping address, and the destination address in the third instruction message is different from the marked previous mapping address; and add a source address in the third instruction message to an alarm list, and discard the third instruction message.

Optionally, the receiving module 701 is further configured to:

receive a fourth instruction message sent by the external network device to the internal network device.

The processing module 703 is further configured to: when determining that a source address in the fourth instruction message is the same as one of addresses included in the alarm list, discard the fourth instruction message.

In this embodiment of the present invention, when first receiving the request sent by the internal network device, the NAT device allocates the at least two public network addresses for an internal network address, cyclically activates the at least two public network addresses, and uses an activated address as a public network address to which the private network address of the internal network device is mapped, so that the internal network device does not need to send the heartbeat message to keep the network address mapping alive, thereby reducing energy consumption of the internal network device. Because cyclic activation is performed, the public network address to which the private network address of the internal network device is mapped is not fixed in the session process between the internal network device and the external network device. Therefore, a security risk that the external network device obtains the public network address to which the private network address is mapped is reduced.

Unit division in this embodiment of the present invention is an example, is only logical function division, and may be other division in actual implementation. In addition, functional units in the embodiments of this application may be integrated in one processor, or may exist alone physically, or two or more units are integrated into one unit. The integrated unit may be implemented in a form of hardware, or may be implemented in a form of a software functional module.

Figure 8:
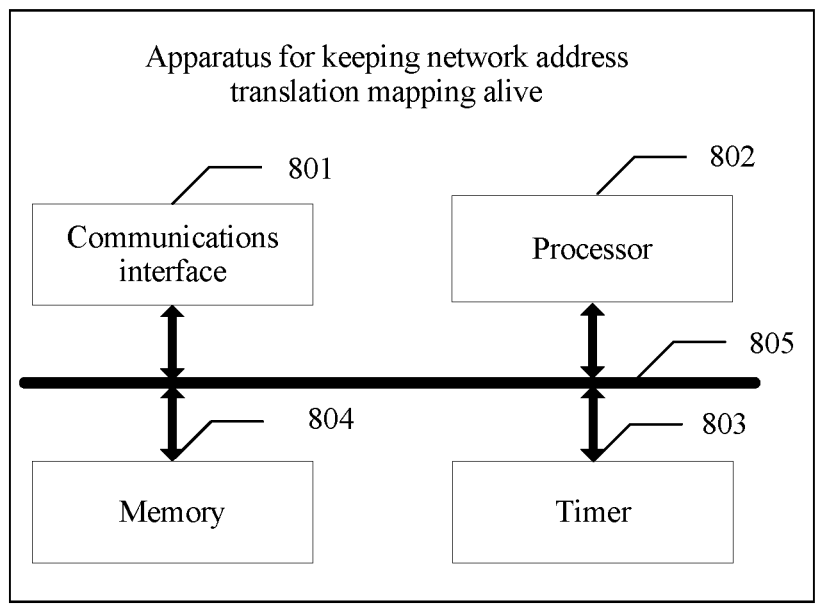
FIG. 8 is a schematic diagram of another apparatus for keeping network address translation mapping alive according to an embodiment of the present invention.

When the integrated unit is implemented in the form of hardware, the receiving module 701 and the sending module 702 are implemented by using a communications interface 801 shown in FIG. 8, the processing module 703 is implemented by using a processor 802, and the timing module 704 may be implemented by using the processor 802, or may be implemented by using a timer 803 or a plurality of timers. Each public network address is corresponding to one timer. An apparatus for keeping network address translation mapping alive shown in FIG. 8 is applied to a NAT device. That is, the apparatus for keeping network address translation mapping alive is disposed inside the NAT device, or is directly implemented by the NAT device.

The processor 802 may be a central processing unit (CPU for short), a digital processing unit, or the like. The apparatus for keeping network address translation mapping alive further includes a memory 804, configured to store a program executed by the processor 802. The processor 802 is configured to execute the program stored in the memory 804.

The memory 804 may be disposed inside the apparatus for keeping network address translation mapping alive, or may be disposed outside the apparatus for keeping network address translation mapping alive.

The communications interface 801, the memory 804, the processor 802, and the timer 803 may be connected by using a bus 805. A manner of connection between other components is merely an example for description, and imposes no limitation. The bus may be classified into an address bus, a data bus, a control bus, and the like. For ease of representation, only one bold line is used to represent the bus in FIG. 8, but this does not mean that there is only one bus or only one type of bus.

The memory 804 may be a volatile memory such as a RAM. Alternatively, the memory 804 may be a non-volatile memory such as a ROM, a flash memory, an HDD, or an SSD. Alternatively, the memory 804 is any other medium that can be used to carry or store expected program code in a command or data structure form and that can be accessed by a computer. However, this is not limited. The memory 804 may be a combination of the memories.

Persons skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Obviously, persons skilled in the art can make various modifications and variations to the present invention without departing from the scope of the present invention. The present invention is intended to cover these modifications and variations provided that they fall within the scope of protection defined by the following claims and their equivalent technologies.

What is claimed is:

1. A method for keeping network address translation mapping alive comprising:
   receiving, by a network address translation (NAT) device, a probe request sent by an internal network device, wherein the probe request comprises a private network address of the internal network device;
   after receiving the probe request, sending, by the NAT device, a probe response to the internal network device, wherein the probe response carries indication information, and the indication information indicates that the internal network device does not actively initiate a heartbeat message to keep network address translation mapping alive;
   allocating, by the NAT device, at least two public network addresses to the internal network device from idle public network addresses comprised in an address resource pool;
   mapping, by the NAT device, a private network address of the internal network device to a current active address, using one of the at least two public network addresses as the current active address in each time period of a subsequent session process between the internal network device and an external network device, including cyclically performing the following operations in sequence for the at least two public network addresses based on a sequence of configuring the at least two public network addresses:
   (a) starting a timing process in response to selecting a current public network address until a timing duration reaches a timeout duration associated with the public network address, and
   (b) using the selected current public network address as the current active address in a current timing process, wherein one public network address is associated with one piece of the timeout duration;
   receiving, by the NAT device, a first data report message sent by the internal network device to the external network device, wherein a source address in the first data report message is the private network address of the internal network device;
   replacing, by the NAT device, the private network address of the internal network device in the first data report message with a first address that serves as the current active address; and
   sending the first data report message to the external network device.

2. The method according to claim 1, further comprising:
   in response to receiving the first data report message sent by the internal network device to the external network device, marking, by the NAT device as a current mapping address, the first address that serves as the current active address.

3. The method according to claim 2, further comprising:
   receiving, by the NAT device, a first instruction message sent by the external network device to the internal network device, wherein a destination address in the first instruction message is a second address, and the marked current mapping address is the second address;
   determining, by the NAT device, that the destination address in the first instruction message is the same as the marked current mapping address;
   changing the destination address in the first instruction message into the private network address of the internal network device to which the second address is mapped; and
   sending the first instruction message to the internal network device.

4. The method according to claim 2, further comprising:
   receiving, by the NAT device, a second data report message sent by the internal network device to the external network device, wherein a source address in the second data report message is the private network address of the internal network device, a public network address that serves as the current active address is a third address, and the marked current mapping address is a fourth address; and
   replacing, by the NAT device, the private network address of the internal network device in the second data report message with the third address, sending the second data report message to the external network device, marking, as a previous mapping address, the fourth address marked as the current mapping address, and marking, as the current mapping address, the third address that serves as the current active address,
   wherein the previous mapping address and the current mapping address are each in a mapping relationship with the private network address of the internal network device.

5. The method according to claim 4, further comprising:
   receiving, by the NAT device, a second instruction message sent by the external network device to the internal network device, wherein a destination address in the second instruction message is a fifth address, the marked current mapping address is a sixth address, and the marked previous mapping address is the fifth address;
   determining, by the NAT device, that the destination address in the second instruction message is different from the marked current mapping address, and the destination address in the second instruction message is the same as the marked previous mapping address; and
   changing, by the NAT device, the destination address in the second instruction message into the private network address of the internal network device to which the fifth address is mapped, and sending the second instruction message to the internal network device.

6. The method according to claim 5, wherein the public network address that serves as the current active address is a seventh address, and the method further comprises:
   in response to determining that the destination address in the second instruction message is different from the marked current mapping address, and the destination address in the second instruction message is the same as the marked previous mapping address, marking, by the NAT device as the current mapping address, the seventh address that serves as the current active address, and marking, by the NAT device as the previous mapping address, the sixth address which is previously marked as the current mapping address.

7. The method according to claim 6, wherein after determining that the destination address in the second instruction message is different from the marked current mapping address, and the destination address in the second instruction message is the same as the marked previous mapping address, the method further comprises:
   sending, by the NAT device, an indication message to the external network device, wherein the indication message indicates that an address to which the internal network device is mapped is changed into the seventh address that serves as the current active address.

8. The method according to claim 4, further comprising:
receiving, by the NAT device, a third instruction message sent by the external network device to the internal network device, wherein a destination address in the third instruction message is an eighth address, the marked current mapping address is a ninth address, and the marked previous mapping address is a tenth address;
determining, by the NAT device, that the destination address in the third instruction message is different from the marked current mapping address, and the destination address in the third instruction message is different from the marked previous mapping address; and
adding, by the NAT device, a source address in the third instruction message to an alarm list, and discarding the third instruction message.

9. The method according to claim 8, further comprising:
receiving, by the NAT device, a fourth instruction message sent by the external network device to the internal network device; and
in response to determining that a source address in the fourth instruction message is the same as one of addresses comprised in the alarm list, discarding, by the NAT device, the fourth instruction message.

10. An apparatus for keeping network address translation mapping alive, wherein the apparatus is applied to a network address translation (NAT) device and comprises:
a memory and a processor,
the memory stores a computer readable program; and
the processor runs the program in the memory to implement the following method:
receiving a probe request sent by an internal network device, wherein the probe request comprises a private network address of the internal network device;
sending a probe response to the internal network device, wherein the probe response carries indication information, and the indication information indicates that the internal network device does not actively initiate a heartbeat message to keep network address translation mapping alive; and
allocating at least two public network addresses to the internal network device from idle public network addresses comprised in an address resource pool, and mapping a private network address of the internal network device to a current active address, using one of the at least two public network addresses as the current active address in each time period of a subsequent session process between the internal network device and an external network device, including cyclically performing the following operations in sequence for the at least two public network addresses based on a sequence of configuring the at least two public network addresses:
(a) starting a timing process in response to selecting a current public network address until a timing duration reaches a timeout duration associated with the public network address, and
(b) using the selected current public network address as the current active address in a current timing process, wherein one public network address is associated with one piece of the timeout duration;
receiving a first data report message sent by the internal network device to the external network device, wherein a source address in the first data report message is the private network address of the internal network device;
replacing the private network address of the internal network device in the first data report message with a first address that serves as the current active address; and
sending the first data report message to the external network device.

11. The apparatus according to claim 10, wherein the method which the processor is configured to implement further includes:
in response to receiving the first data report message sent by the internal network device to the external network device, marking, the first address that serves as the current active address, as a current mapping address.

12. The apparatus according to claim 11, wherein the method which the processor is configured to implement further includes:
receiving a first instruction message sent by the external network device to the internal network device, wherein a destination address in the first instruction message is a second address, and the marked current mapping address is the second address;
determining that the destination address in the first instruction message is the same as the marked current mapping address;
changing the destination address in the first instruction message into the private network address of the internal network device to which the second address is mapped; and
sending the first instruction message to the internal network device.

13. The apparatus according to claim 11, wherein the method which the processor is configured to implement further includes:
receiving a second data report message sent by the internal network device to the external network device, wherein a source address in the second data report message is the private network address of the internal network device, a public network address that serves as the current active address is a third address, and the marked current mapping address is a fourth address; and
replacing the private network address of the internal network device in the second data report message with the third address, sending the second data report message to the external network device, marking, as a previous mapping address, the fourth address marked as the current mapping address, and marking, as the current mapping address, the third address that serves as the current active address,
wherein the previous mapping address and the current mapping address are each in a mapping relationship with the private network address of the internal network device.

14. The apparatus according to claim 13, wherein the method which the processor is configured to implement further includes:
receiving a second instruction message sent by the external network device to the internal network device, wherein a destination address in the second instruction message is a fifth address, the marked current mapping address is a sixth address, and the marked previous mapping address is the fifth address;
determining that the destination address in the second instruction message is different from the marked current mapping address, and the destination address in the second instruction message is the same as the marked previous mapping address; and changing the destination address in the second instruction message into the private network address of the internal network device to which the fifth address is mapped, and sending the second instruction message to the internal network device.

15. The apparatus according to claim 13, wherein the public network address that serves as the current active address is a seventh address, and the method further comprises:
- in response to determining that the destination address in the second instruction message is different from the marked current mapping address, and the destination address in the second instruction message is the same as the marked previous mapping address, marking, as the current mapping address, the seventh address that serves as the current active address, and marking, as the previous mapping address, the sixth address which is previously marked as the current mapping address.

16. The apparatus according to claim 15, wherein after determining that the destination address in the second instruction message is different from the marked current mapping address, and the destination address in the second instruction message is the same as the marked previous mapping address, the method further comprises:
- sending an indication message to the external network device, wherein the indication message indicates that an address to which the internal network device is mapped is changed into the seventh address that serves as the current active address.

* * * * *